United States Patent Office 3,456,991
Patented July 22, 1969

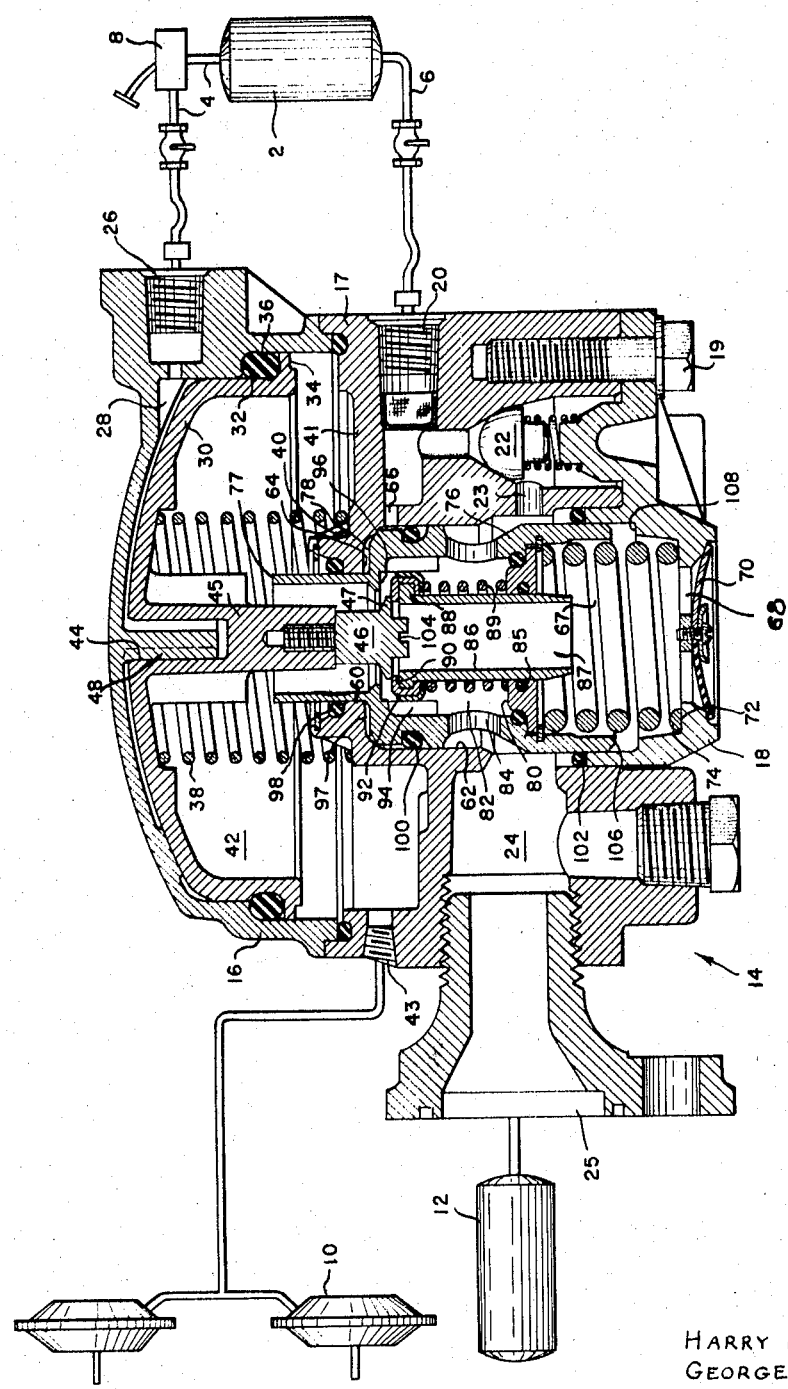

3,456,991
RELAY EMERGENCY VALVE
Harry M. Valentine, George W. Stoudt, and Herbert A. Kemble, Elyria, Ohio, assignors to Bendix-Westinghouse Automotive Air Brake Company, Elyria, Ohio, a corporation of Delaware
Filed Nov. 13, 1967, Ser. No. 682,226
Int. Cl. B60t 17/04, 15/02, 11/02
U.S. Cl. 303—29                                        7 Claims

ABSTRACT OF THE DISCLOSURE

A relay emergency valve for a fluid pressure braking system wherein an emergency piston normally retained in inactive position by pressure in an emergency line also provides passage means through the piston for delivery of pressure to the brake chambers during normal operation and also affords exhaust passage means through the piston to effect release of the brakes under normal conditions, the arrangement eliminating the necessity for an exhaust passage extending vertically upwardly through a relay member such as a piston which is responsive to service pressure to control the brakes.

---

This invention relates to fluid pressure brake valves and more particularly to an improved relay-emergency valve especially, though not exclusively, adapted for use in automotive braking system for tractor-trailer combinations.

Relay emergency valves for automotive brake systems are well known and usually include an emergency piston subjected to the opposing forces of main reservoir pressure delivered to the valve through an emergency line, and of either an emergency source of fluid pressure or a spring. When the pressure in the emergency line is above a predetermined value, the emergency piston is moved to its safe or inactive position and becomes active to effect an automatic emergency application of the brake only upon decrease of the pressure in the emergency line below a predetermined value. When the emergency piston is in its inactive position, serivce pressure delivered to a relay member causes the latter to open a delivery passage, which is normally closed in response to movement of the emergency piston to its safe position, while simultaneously closing an exhaust passage.

Heretofore either the exhaust, or delivery passage or both have been remote from the emergency piston, a common arrangement being an exhaust passage extending outwardly throughout the relay piston, thus detracting from the effective area thereof, and the delivery passage extending through the emergency piston. Such an arrangement is often unduly complex and where delivery and exhaust passages extend in opposite directions from each other the relay-emergency valve has a substantial height which is sometimes inconvenient.

It is the broad object of the present invention to provide an improved relay emergency valve which eliminates the foregoing problems.

More particularly, it is an object of the invention to provide a relay emergency valve wherein instead of having delivery and/or exhaust passages remote from the emergency piston, both passages extend through the emergency piston in parallel or co-axial and substantially co-extensive relationship whereby there is provided a far more compact and less complex valve than heretofore.

The foregoing and other objects and their attendant advantages will become apparent as the following detailed description is read in conjunction with the single figure illustrating diagrammatically a fluid pressure brake system and showing a vertical cross-sectional view of a relay emergency valve incorporating the features of the invention.

The valve of the invention is illustrated in connection with a tractor-trailer braking system which includes a tractor-carried main fluid pressure service reservoir 2 normally supplied by a compressor (not shown). The main reservoir 2 has leading therefrom service and emergency lines 4 and 6, the former passing through a manually operated brake valve 8 and including a branch leading rearwardly for connection to the trailer system. The emergency line 6 leads directly rearwardly to the trailer system which includes trailer brake chambers 10 and an emergency reservoir 12, all of which are interconnected with the service and emergency lines 4, 6 through a relay emergency valve 14 constructed in accordance with the present invention.

The valve 14 of the invention comprises a casing composed of an upper, intermediate and lower part 16, 17, 18 all rigidly connected together as by bolts 19 to form a housing for the valve mechanism. The main reservoir 2 is connected by way of the emergency line 6 to an emergency port 20 in the valve body which in turn is connected through check valve 22, a port 23 and passage 24 with a port 25 leading to the emergency or trailer reservoir 12. It will be apparent that with this arrangement when the pressure in the emergency reservoir is a pre-determined amount lower than the pressure in the main reservoir 2, the check valve 22 is unseated and fluid flows from reservoir 2 to reservoir 12 whence it is prevented from returning to the main reservoir by the check valve 22.

The brake valve 8 in the service line 4 on the tractor is of the usual self-lapping type which delivers pressure in proportion to its degree of actuation. From the brake valve fluid pressure passes through the service line branch 4 to service port 26 in the upper part 16 of the valve body, which in turn leads into a relay cylinder or cavity 28 containing a relay piston 30. As can be seen, the cylinder 28 is stepped at 32 and the piston 30 is provided with an outwardly extending radial flange 34 which is normally spaced vertically below the step 32, the space between the parts 32, 34 being occupied by an O-ring 36 which is laterally compressed to a somewhat oval configuration by the opposing vertical walls on the outer side of the piston immediately above the flange 34 and the inner wall of the cylinder 22 immediately below the step 32. When service pressure is admitted to the service port 26 of the valve of the invention, it acts downwardly on the piston 30 to move it against the upward force of a return spring 38 interposed between the lower side of the piston as shown and a shoulder 40 centrally disposed on a wall part 41 on the upper side of the intermediate part 17 of the valve body and defining with the lower side of the piston 30 a delivery cavity 42 which is connected to the trailer brake chambers 10 by way of a delivery port 43. As the piston moves downwardly, the pressure acting on the upper side thereof also acts on the compressed O-ring 36 to move this downwardly with the piston, the O-ring preserving a fluid seal at all times between the control and delivery cavities on opposite sides of the piston.

As can be seen the relay piston 30 is provided with a central guide recess 44 in a downwardly extending projection 45 which is centrally counter-bored and threaded at its lower end to adjustably receive a member 46 having adjacent its lower end an annular exhaust valve seat 47, whose function will be later described with greater particularity. Slidably received within the recess 44 is a downwardly extending guide member 48 integral with the upper part 16 of the valve body as shown. The purpose of the guide 48 is to eliminate any possible tendency of the piston to cock during its movement.

The projection 45 of the relay piston and the member 46 carrying the exhaust valve seat extend axially downwardly through a bore 60 through the wall part 41 and leading into a larger diameter counter bore 62, formed partly in the lower casing member 18, said bores having therebetween a shoulder 64 connected by a passage 66 with the emergency port 20. The counter-bore is of uniform diameter throughout its length and its lower end defines an exhaust cavity 67 having an exhaust port 68 which is at all times connected to atmosphere through a dust cover 70.

Surrounding the exhaust port 68 is a shoulder 72 seating one end of a spring 74. An emergency piston 76 is slidable in the counter bore and includes a tubular upper extension 77 of less diameter than the piston and slidably received in the bore 60. The piston has a fluid responsive shoulder area 78 between its upper and lower parts 77, 76 and is normally biased by the spring 74 against the shoulder 64. It will be observed that the emergency piston is hollow and includes a sealed closure member 80 forming with the internal wall of the emergency piston a cavity or chamber 82 defining in part, a delivery passage through the piston and which is at all times in open communication with the emergency reservoir 12 by way of passage 24 and ports 84 through the side wall of the piston.

The closure member 80 has a central bore 85 therethrough which slidably and sealingly receives the lower open end of a tubular exhaust member 86 having an exhaust passage 87 extending therethrough in free communication with the exhaust port 68. The upper end of the exhaust member 86 is flanged at 88 and interposed between the flange and the upper side of the closure member 80 is a spring 89 normally biassing the member 86 to the position of the drawing.

Received over the flange 88 is a combined delivery and exhaust valve element 90 surrounded by a valve guide 92 in sliding engagement with an annular series of vertical flutes 94 which, when the parts of the valve are in the position of the drawing, serve to connect the interior 82 of the piston with the delivery cavity 42 by way of the tubular extension 77. The lower end of the extension 77 is provided with an annular valve seat 96 arranged to sealingly engage the outer part of the combined inlet and exhaust valve 90 when the emergency piston is moved downwardly from its position of the drawing in response to emergency pressure. This occurs when main reservoir pressure is delivered via the emergency port 20 through the passage 66 to the emergency chamber or cavity 97 defined by the shoulder 78 of the emergency piston, the shoulder 64 between the bore 60 and counter bore 62, and a pair of O-rings 98, 100 respectively surrounding the extension 77 and the emergency piston 76 below its shoulder 78 as shown. The lower end of the piston 76 is likewise sealed by an O-ring 102 and it with the O-ring 100 define with the cavity 82 in the piston a pair of opposed motive areas of identical size whereby pressure in the emergency reservoir acting on the motive areas is exactly balanced and has no effect on the positioning of the emergency piston.

As can be seen in the drawing when the emergency piston is in the position shown, the exhaust passage is closed by the exhaust valve portion of the valve member 90 which hangs up on or is intercepted by the exhaust valve seat 47, the spring 89 being compressed somewhat as the piston moves into its full upper position. To insure proper mounting of the member 46 carrying seat 47, the former is provided with a tool slot 104 as shown.

In operation, assuming first, a no-air condition, as pressure fluid is delivered to the main reservoir 2 it initially flows by way of the emergency line 6 into the emergency port 20 and from there into the emergency cavity 97 and also past the check valve 22 into the trailer reservoir 12 by way of the port 23, passage 24 and port 25. At the same time, pressure fluid flows by way of the port 23 through ports 84 into the chamber 82 in the emergency piston 76 whence it flows by way of flutes 94, tubular extension 77, delivery cavity 42 and port 43 to apply the brakes as the pressure is building up in the system.

When the pressure has risen to a predetermined level, sufficient force is exerted on the shoulder 78 of the emergency piston 76 to move it downwardly against the upward force of the spring 74. As the piston moves downwardly, the exhaust valve portion of the combined delivery and exhaust valve 90 remains in sealing engagement with the exhaust valve seat 47 until the annular delivery valve seat 96 engages the delivery valve portion of the combined valve member to close off the delivery passage through the emergency piston and thus disconnect the trailer reservoir from the trailer brake chambers 10. Thereafter the seat 96 moves the valve 90 away from the exhaust valve seat 47 to connect the brake chambers to atmosphere through the exhaust passage 87, in the tubular exhaust member 86.

The emergency piston 76 continues to move downwardly until the lower edge 106 thereof engages a shoulder 108 in the exhaust cavity and so long as the pressure in the emergency line acting in the emergency cavity 97 is above a predetermined value as determined by the spring 74, the emergency piston 76 remains in depressed deactivated position and the valve mechanism thereafter functions in response to service pressure as if the emergency piston were not a part thereof. That is to say, when service pressure is admitted from the brake valve 8 to service port 26, the relay piston 30 is moved downwardly until the exhaust valve seat 47 engages the combined inlet and exhaust valve 90 to first close off the exhaust passage 87 in the tubular member 86 and thereafter move the delivery valve portion of the valve member 90 away from the inlet valve seat 96 so that fluid pressure may flow from the trailer reservoir, by way of passage 24, ports 84, flutes 94, valve seat 96, delivery cavity 42 and delivery port 43 to the trailer brake chambers 10 to apply the brakes. When the brakes are to be released following a normal service application, the brake valve 8 is opened to exhaust service pressure from the upper side of the relay piston 30 whereupon the spring 38 moves the piston upwardly. As the relay piston 30 returns to the position of the drawing, the combined inlet and exhaust valve 90 engages the delivery valve seat 96 and thereafter the exhaust valve 47 is lifted clear of the valve member 90 to connect the brake chambers to atmosphere as previously described.

Assume now that the emergency conduit 6 suddenly ruptures so that there is a rapid loss of pressure from the emergency cavity 97. In this event, the spring 74 immediately returns the emergency piston 76 to the position of the drawing whereupon the exhaust passage 87 in member 86 is closed off and immediately thereafter the inlet valve seat 96 is moved to its open position to automatically connect the trailer brake chambers 10 to the trailer reservoir 12 by the route previously described. Until such time as pressure is restored in the emergency chamber 97 or until all of the pressure has been released from the trailer brake reservoir, the trailer brakes remain in applied condition.

In the event of a slow leak in the emergency conduit 6 so that fluid pressure in the emergency cavity blows down at a relatively slow rate, the parts of the valve return to the position of the drawing sufficiently slowly so that pressure is delivered to the trailer brake chambers 10 at a relatively slow rate to bring the vehicle to a gradual stop.

From the foregoing description, it will be seen that the invention provides a relay emergency valve wherein both the delivery and exhaust passages extend through the emergency piston. This arrangement eliminates the necessity for an exhaust passage which extends upwardly through the relay piston 30 where the passage decreases the effective area of the piston as well as requiring a valve housing of extensive height. Furthermore, because the delivery and exhaust valves are contiguous to each other and at the same level, centrally within the valve body, complexities occasioned by remote location of these valves with respect to the emergency and/or relay pistons is entirely eliminated.

What is claimed is:

1. An emergency valve for controlling the application of pressure from an emergency fluid pressure reservoir to brake chambers in response to loss of pressure from an emergency line comprising a casing, an emergency cavity in said casing for connection to said emergency line, an emergency piston in said casing having a motive area exposed at all times to the pressure in said emergency cavity, delivery and exhaust passages through said piston for connecting said brake chambers to said emergency reservoir and to atmosphere, spring means urging said piston at all times toward a first position in said casing, said piston being movable to a second position in opposition to said spring means in response to pressure in said emergency cavity above a pre-determined value, delivery and exhaust valve means co-operating with the respective passages in said piston to disconnect said brake chambers from atmosphere and connect said chambers to said emergency reservoir when said piston is in its first position and vice versa when said piston is in its second position, said piston being moved from its second position towards its first position by said spring means to effect an emergency application of the brakes in response to loss of pressure in said emergency line and in said emergency cavity below a pre-determined value, a chamber in said emergency piston having a side wall and opposed ends, a port in said side wall for connection the chamber at all times to said emergency reservoir, said delivery passage extending through one end of said chamber for communication with said brake chambers, and a co-axial exhaust passage extending through the other end of the said chamber for connection to atmosphere, said exhaust and delivery valves being disposed within said chamber, and valve operating means in said casing co-operating with said emergency piston to actuate said valve means to close said delivery passage and open said exhaust passage when said piston moves from its first to its second position and vice versa when said piston moves from its second to its first position.

2. The emergency valve of claim 1 including a delivery cavity in said casing with which said delivery passage communicates, and a pressure responsive relay member in said delivery cavity movable in response to pressure in a service line, said valve operating means also cooperating with said relay member upon the delivery of service pressure thereto to actuate said valve means when said emergency piston is in its second position to open the delivery passage and close said exhaust passage and vice versa when service pressure is exhausted from said relay member.

3. The emergency valve of claim 1 wherein said exhaust passage includes a tubular member slidably extending into said chamber in said emergency piston in co-axial relationship with said delivery passage, the outer end of said tubular member communicating at all times with atmosphere and the inner end thereof extending into close spaced adjacency with the inner end of said delivery passage, said inlet and exhaust valve means being carried by said inner end of said tubular exhaust member, the inner end of said delivery passage including a valve seat engageable with said inlet and exhaust valve means to disconnect said delivery passage from the chamber in said piston upon movement of said piston to its second position, and an exhaust valve seat normally engaged by said inlet and exhaust valve member to disconnect said exhaust passage from said chamber when said piston is in its first position, said valve member being withdrawn from said exhaust valve seat by said delivery valve seat to connect said delivery passage with said exhaust passage while disconnecting the latter from said chamber when said piston is moved to its second position.

4. The emergency valve of claim 3 wherein said inlet and exhaust valve means includes inlet and exhaust valve parts lying substantially within a common horizontal plane.

5. The emergency valve of claim 2 wherein said exhaust valve seat is operatively connected to said relay member.

6. An emergency valve for controlling the application of pressure from an emergency fluid pressure reservoir to brake chambers in response to loss of pressure from an emergency line comprising a casing, an emergency cavity in said casing for connection to said emergency line, an emergency piston in said casing having a motive area exposed at all times to the pressure in said emergency cavity, delivery and exhaust passages through said piston for connecting said brake chambers to said emergency reservoir and to atmosphere, spring means urging said piston at all times toward a first position in said casing, said piston being movable to a second position in opposition to said spring means in response to pressure in said emergency cavity above a pre-determined value, delivery and exhaust valve means co-operating with the respective passages in said piston to disconnect said brake chambers from atmosphere and connect said chambers to said emergency reservoir when said piston is in its first position and vice versa when said piston is in its second position, said piston being moved from its second position towards its first position by said spring means to effect an emergency application of the brakes in response to loss of pressure in said emergency line and in said emergency cavity below a pre-determined value, said casing including a delivery cavity adapted to be connected to said brake chambers and a fixed wall defining one side of said cavity, a bore through said wall and a counter-bore of greater diameter than said bore and into which said bore co-axially leads, said emergency piston being slidably received in said counter-bore, a chamber within said piston and port means for connecting said chamber at all times with said emergency reservoir, a co-axial tubular extension integral with one end of said piston but of smaller diameter slidably and sealingly received in said bore and defining with said piston a fluid pressure motive area connected at all times with said emergency line, a tubular exhaust member within the chamber in said piston in co-axial relationship with said bore and counter-bore and resiliently biased in the direction of said tubular extension, said tubular exhaust member extending sealingly and slidably through the lower wall of the emergency piston, the opposite end of said tubular exhaust member carrying an annular valve member slidably within said piston, an annular exhaust valve seat within the chamber and positioned over said valve member for engagement thereby to close said exhaust passage, an annular delivery valve seat carried by said tubular extension and disposed over said valve means for engagement therewith to disconnect said tubular extension and hence said delivery passage from the chamber in said piston, said exhaust valve seat normally engaging said valve member and said delivery valve seat being normally out of engagement with said valve member, when said emergency piston is in its first position, movement of said piston in response to pre-determined pressure at said emergency line to said second position causing said delivery valve seat to sealingly engage said valve member to disconnect said delivery cavity from said emergency reservoir and thereafter withdraw said valve member from said exhaust valve seat to connect said delivery cavity to atmosphere.

7. The emergency valve of claim 6 wherein said delivery cavity includes a second wall defined by a relay piston in opposition to said first wall, the opposite side of said piston defining with said casing a relay chamber adapted to be connected to a service port, said annular exhaust valve seat being carried by said relay piston for operating said delivery and exhaust valve in response to supply and exhaustion of service pressure to and from said relay chamber when said emergency piston is in its second position.

References Cited
UNITED STATES PATENTS

| | | | |
|---|---|---|---|
| 2,937,052 | 5/1960 | Gates | 303—29 |
| 3,059,975 | 10/1962 | Morse | 303—40 X |
| 3,232,674 | 2/1966 | Stelzer | 303—7 |
| 3,240,534 | 3/1966 | Stelzer | 303—40 |

MILTON BUCHLER, Primary Examiner

JOHN J. McLAUGHLIN, Jr., Assistant Examiner

U.S. Cl. X.R.

303—40, 48